(12) United States Patent
Mason

(10) Patent No.: US 6,588,852 B2
(45) Date of Patent: Jul. 8, 2003

(54) WHEEL SPOKE ADJUSTER GUARD

(76) Inventor: Steven Mason, 2702 Wilmington Dr., Ontario, CA (US) 91761

( * ) Notice: Subject to any disclaimer, the term of this patent is extended or adjusted under 35 U.S.C. 154(b) by 0 days.

(21) Appl. No.: 09/950,209

(22) Filed: Sep. 10, 2001

(65) Prior Publication Data

US 2003/0047986 A1 Mar. 13, 2003

(51) Int. Cl.$^7$ .............................. B60B 7/06; B60B 1/00; B60B 5/00; B60B 9/26
(52) U.S. Cl. ..................... 301/37.41; 301/104; D12/205
(58) Field of Search ....................... 301/37.411, 37.108, 301/37.101, 58, 59, 104; 411/427; D12/205

(56) References Cited

U.S. PATENT DOCUMENTS

| | | | | |
|---|---|---|---|---|
| 43,651 A | * | 7/1864 | Woodard | 301/58 |
| 286,476 A | * | 10/1883 | Notley | 301/59 |
| 516,482 A | * | 3/1894 | Focht, Jr. | 301/58 |
| 2,475,451 A | * | 7/1949 | Gouirand | 301/37.41 |
| 4,322,195 A | * | 3/1982 | Rebish et al. | 301/37.108 |
| 5,673,976 A | * | 10/1997 | Hillis et al. | 301/58 |
| 6,205,664 B1 | * | 3/2001 | Cappellotto | 301/58 |
| 6,364,423 B1 | * | 4/2002 | Chen | 301/104 |

* cited by examiner

*Primary Examiner*—S. Joseph Morano
*Assistant Examiner*—Jason R. Bellinger
(74) *Attorney, Agent, or Firm*—Lewis M Brande; Thomas A. McCleary; Brande & McCleary

(57) ABSTRACT

A Wheel Spoke Adjuster Guard that comprises a visually pleasing outer shape with an internal cavity, where the internal cavity has a lower portion shaped complimentary to the wheel adjuster nuts on the wheel spokes of either motorcycles, bicycles, or other motor conveyances using spoked wheels. The upper portion of the internal cavity has a shape complimentary to the existing diameters of the spokes of the wheel assemblies. The adjuster guard has a means to lock the Wheel Spoke Adjuster Guard onto the wheel spoke, preventing any unwanted motion.

5 Claims, 2 Drawing Sheets

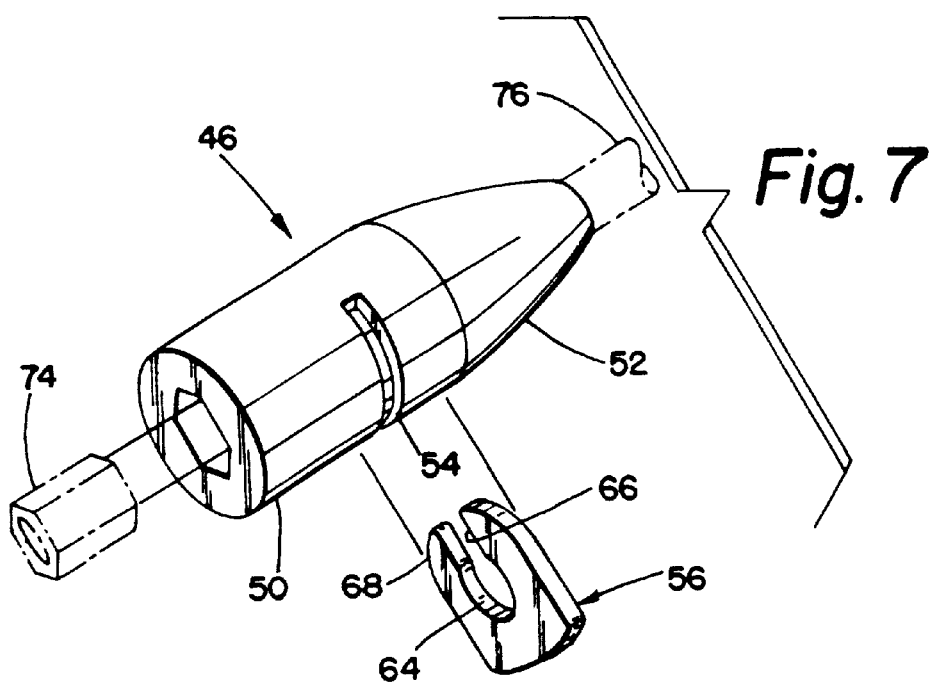
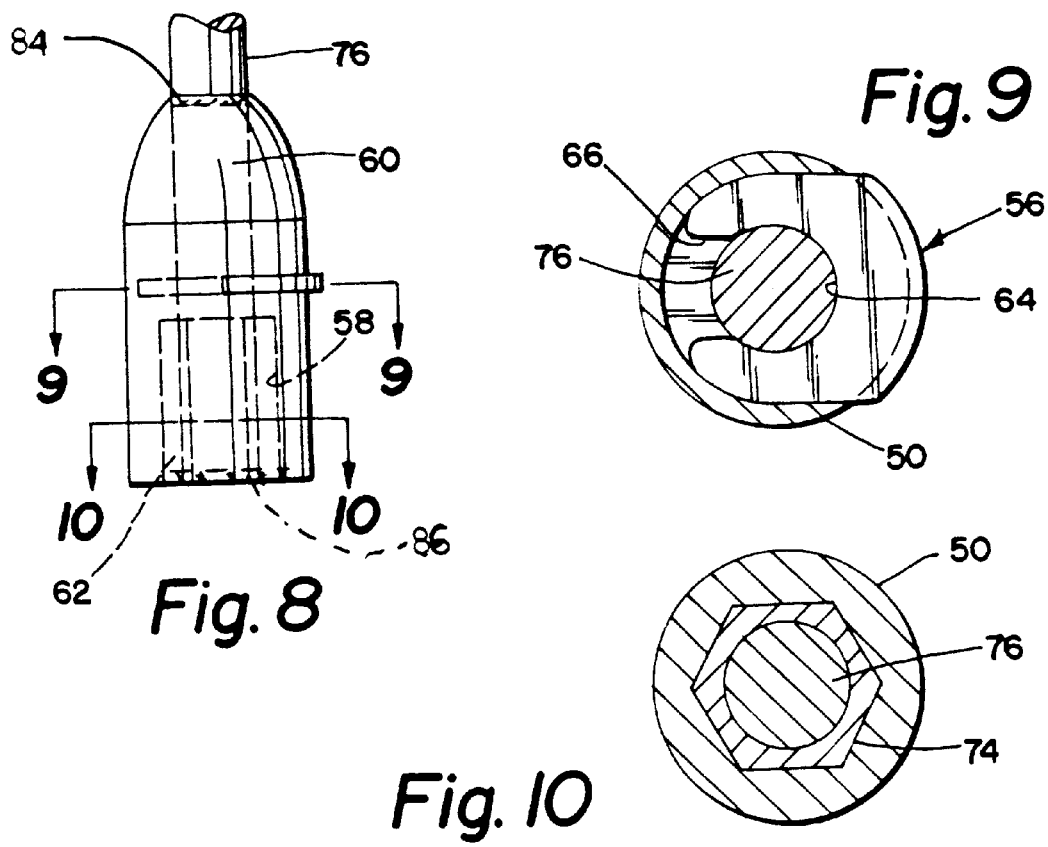

WHEEL SPOKE ADJUSTER GUARD

BACKGROUND OF THE INVENTION

1. Field of the Invention

This invention relates to a device that can protect the adjustment and wheel rim areas of spoked wheels from the intrusion of foreign objects such as dirt. By adding this device to spoked wheels, they will enhance the functionality of the spoke adjusting areas of the wheel rims by increasing the life span of the spoked wheels and providing a decorative addition to the spoked wheel.

2. Description of the Prior Art

The use of devices to protect the adjustment areas of wheel spokes is known in the prior art.

U.S. Pat. No. 4,906,050 by Soder et al., discloses "Beads for Bicycle Wheel Spokes." The principle purpose of this invention is to provide visual and audible effects while the wheel is being used. This invention discloses a bead that is free to move along the length of the spoke, which then creates a pleasing visual effect. This invention is specifically related to the creation of a visual effect and an audible noise.

U.S. Pat. No. 4,695,099 by Klein, discloses a "Wheel Spoke Adjuster Guard." This invention is a two-piece device that is snapped together around the adjuster lug portion of the spoked wheel.

U.S. Pat. No. 2,558,423 by Dobrosky, discloses "A Spoke Ornament for Bicycle Wheels." This device uses tubular sections in unison, where when connected together, have interlocking key areas that prevent any one element from being dislodged from the spoke. This invention is ornamental in concept. When attached to a bicycle wheel, the alternating colors create alternating bands of color while the wheel is moving.

U.S. Pat. No. 2,269,670 by Kieckbusch, discloses a "Balance Weight." This invention is used to balance motorcycle wheels inexpensively, easily and simply.

U.S. Pat. No. 5,801,883 by Peters, discloses "High Visibility Reflective Tubing for Bicycle Wheels." This invention is to create a highly reflective area of a bicycle rim in order to enhance the bicyclist's visibility in low light and bad weather conditions.

U.S. Pat. Nos. 4,906,050, 2,558,423, and 5,801,883 contain no teaching or suggestion that they may be used to attach to the lug area of spoked wheels and prevent the intrusion of foreign materials. They specifically teach the art of either enhancing the visibility of the operator, or making a pleasing sound.

SUMMARY OF THE INVENTION

It is an object of the invention to create a one piece device that can protect the adjusting lug areas, the threaded end of the spoke, and the wheel rim holes of spoked wheel assemblies from the intrusion of foreign materials such as dirt.

It is another object of the invention to create a one piece device that will prevent the unwanted adjustment of the spoked wheel assemblies without the operator's permission.

Other objects, advantages, and novel features of the present invention will become apparent from the following detailed description of the invention when considered in conjunction with the drawings accompanying the patent.

BRIEF DESCRIPTION OF THE DRAWINGS

FIG. 7 shows a perspective view of an alternative embodiment of the wheel spoke adjuster guard.

FIG. 8 shows the alternative embodiment in side view.

FIG. 9 shows a cross sectional view of the alternative embodiment of the wheel spoke adjuster guard.

FIG. 10 shows a cross sectional view of the wheel spoke adjuster guard and the relative cross sections of the spoke nut and spoke diameter

DETAILED DESCRIPTION

Figure 1:
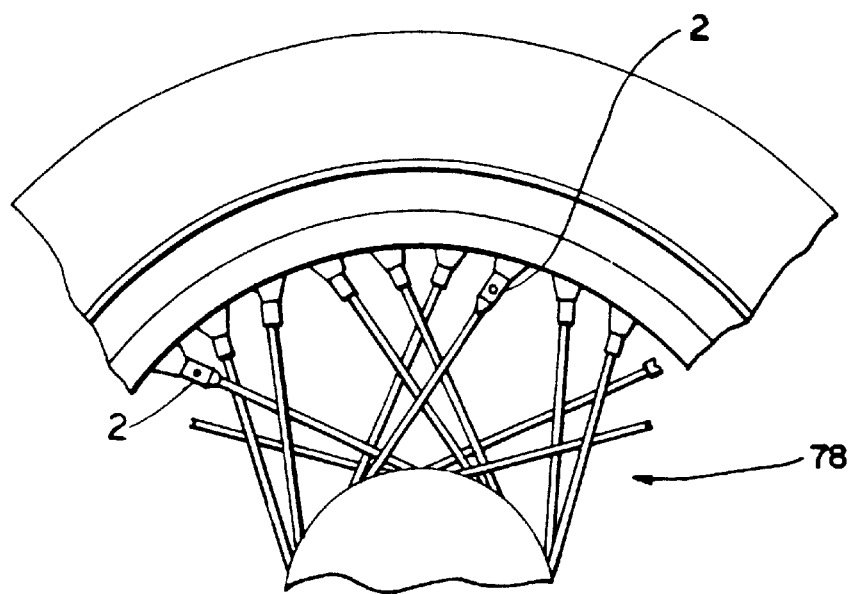
FIG. 1 shows a view of a wheel with the wheel spoke adjuster guards attached to the spokes of a wheel assembly.
Figure 2:
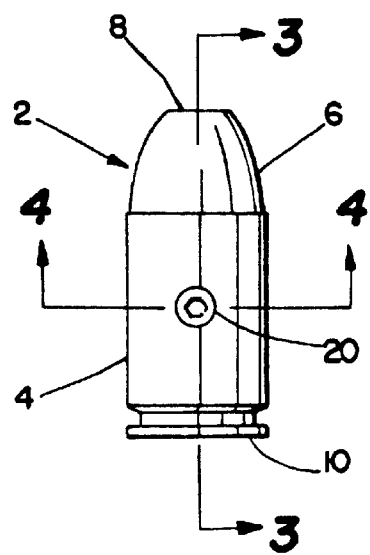
FIG. 2 shows a wheel spoke adjuster guard in side view.
Figure 3:
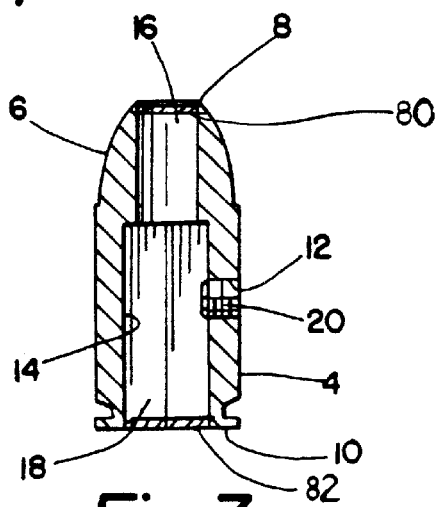
FIG. 3 shows a longitudinal cross section of the wheel spoke adjuster guard.
Figure 4:
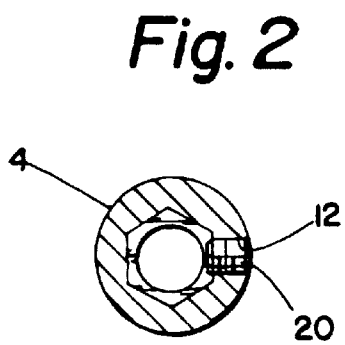
FIG. 4 shows a transverse cross section of the wheel spoke adjuster guard.
Figure 5:
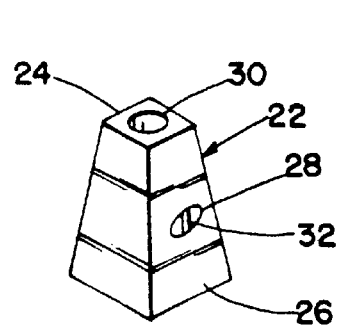
FIG. 5 shows an alternative shape of the wheel spoke adjuster guard in the shape of a four (4) sided pyramid.
Figure 6:
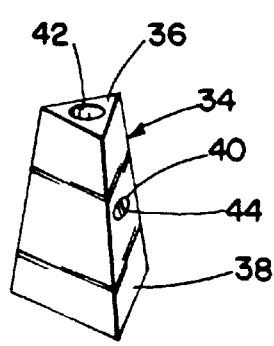
FIG. 6 shows an alternative shape of the wheel spoke adjuster guard in the shape of a three (3) sided pyramid.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

With respect to figure two (2), a wheel spoke adjuster guard (2) is shown having a cylindrical shaped barrel section (4) topped with an ogive or bullet shaped top (6). The wheel spoke adjuster guard (2) has a top (8) and a bottom (10), where both the top (8) and the bottom (10) are flat, parallel to each other and perpendicular to a longitudinal axis. The top (8) is smaller in diameter than the bottom (10). Medially located on the cylindrical shaped barrel section (4) a threaded hole (12) is defined therein.

With respect to figure three (3), the wheel spoke adjuster guard (2) has an internal cavity (14) defined therein, where the internal cavity (14) is centrally located. The internal cavity (14) has an upper portion (16) and a lower portion (18). The lower portion (16) of the internal cavity (14) has a shape complimentary to the nuts on a wheel spoke (74) in this particular embodiment a hexagonal or six (6) sided nut is shown, but the nut element on the wheel spoke may also be octagonal or eight (8) sided or rectangular or four (4) sided in other envisioned embodiments. The upper portion (16) of the internal cavity (14) is circular in shape which is complimentary in diameter to the wheel spokes (76) in use today. The threaded hole (12) which is medially located on the cylindrical shaped barrel section (4) communicates with the internal cavity (14), and allows a threaded set screw (20) to be threadably engaged therein. The threaded set screw (20) will bear against the nut element on a spoked wheel, preventing the wheel spoke adjuster guard (2) from moving after installation as shown in Figure one (1). The upper portion (16) of the wheel spoke adjuster guard (2) has an upper seal (80) installed. The lower portion (18) of the wheel spoke adjuster guard has a lower seal (82) installed. The upper seal (80) and the lower seal (82) prevent dirt and moisture from contaminating the wheel nut (nipple) or the spoke.

Figure five (5) shows an alternative shape to a wheel spoke adjuster guard (22). The shape shown is a four (4) sided pyramid. The wheel spoke adjuster guard (22) shown has a flat top (24) which allows the spoke of a wheel to penetrate therethrough. The wheel spoke adjuster guard (22) has a side (26) where the side (26) has a threaded hole (28) defined therein. The threaded hole (28) being allowed to communicate with the internal cavity (30) defined therein. A threaded set screw (32) is threadably engaged in the threaded hole (28) fixing the four (4) sided wheel spoke adjuster guard (22) to the wheel spoke.

Figure six (6) shows and alternative shape to a wheel spoke adjuster guard (34). The shape shown is a three (3) sided pyramids. The wheel spoke adjuster guard (34) shown has a second flat top (36) which allows the spoke of a wheel to penetrate therethrough. The wheel spoke adjuster guard (34) has a side (38) where the side (38) has a threaded hole (40) defined therein. The threaded hole (40) is allowed to communicate with an internal cavity (42) defined therein. A threaded set screw (44) is threadably engaged in the threaded hole (40) fixing the three (3) sided wheel spoke adjuster guard (34) to the wheel spoke.

Figure seven (7) shows a perspective view of an alternative embodiment of a wheel spoke adjuster guard (46). The wheel spoke adjuster guard (46) has a cylindrical portion (50) as well as an ogive or bullet shaped tip portion (52). The cylindrical portion (50) of the wheel spoke adjuster guard (46) has a groove (54) defined therein. The groove (54) is large enough to permit a spring clip (56) to be inserted therein. The spring clip (56) is shown as essentially a flat plate.

Figure eight (8) shows that the wheel spoke adjuster guard (46) has a centrally located internal cavity (58) defined therein. The centrally located cavity (58) has an upper portion (60) and a lower portion (62). The lower portion (62) of the internal cavity (58) has a shape complimentary to the nuts (74) on a wheel spoke in this particular embodiment octagonal or eight (8) sided but could also be hexagonal or six (6) sided. The upper portion (60) of the internal cavity (58) is circular in shape which is complimentary in diameter to the wheel spokes (76) in use today. The groove (54) is located above the lower portion (62) of the internal cavity (58) of the wheel spoke adjuster guard (46). The upper portion (60) of the wheel spoke adjuster guard (2) has an upper seal (84) installed. The lower portion (62) of the wheel spoke adjuster guard has a lower seal (86) installed. The upper seal (84) and the lower seal (86) prevent dirt and moisture from contaminating the wheel nut (nipple) or the spoke.

The spring clip (56) is shown with a hole (64) defined therein. The spring clip (56) is also shown with a slot (66) defined therein. The slot (66) is smaller in width than the hole (64) defined in the spring clip (56). The spring clip has a nose (68) which is the end that is inserted through the groove (54) in the wheel spoke adjuster guard (46). The slot (66) of the spring clip (56) allows the circular spoke of a wheel to slide through and be captured and positioned by the hole (64) defined in the spring clip (56). The nose (68) of the spring clip (56) is shaped to allow maximum penetration into the wheel spoke adjuster guard (46).

Figure nine (9) shows that the wheel spoke adjuster guard (46) has a second groove (70) defined therein, to allow the spring clip (56) to have a maximum penetration into the wheel spoke adjuster guard (46). When the spring clip (56) is inserted into the wheel spoke adjuster guard (46), the hole (64) in the spring clip (56) frictionally fits around the wheel spoke, locking the wheel spoke adjuster guard (46) into place on the wheel. The slot (66) is also shown smaller than the wheel spoke, therefore requiring additional force to lock the spring clip (56) in place.

FIG. 1 shows a spoked wheel assembly (78) which shows the wheel spoke adjuster guard (2) installed.

What is claimed is:

1. A wheel spoke adjuster guard, comprising;
a) a top and a bottom, said top and said bottom being flat and parallel to each other, said top and said bottom also being perpendicular to a longitudinal axis, said wheel spoke adjuster guard being slidably mounted on a wheel spoke, said wheel spoke adjuster guard having an internal cavity defined therein, said internal cavity being centrally located and having a lower portion and an upper portion, said lower portion having a shape complementary to an octagonally shaped nut common to wheel adjuster nuts, said upper portion being circular in shape and having a diameter complimentary to common wheel spokes;
b) a fastening means to lock said wheel spoke adjuster guard in a fixed position on said wheel spoke; and
c) said wheel spoke adjuster guard having a shape of a four sided pyramid, said top of said wheel spoke adjuster guard being smaller than said bottom wheel spoke adjuster guard.

2. A wheel spoke adjuster guard, comprising;
a) a top and a bottom, said top and said bottom being flat and parallel to each other, said top and said bottom also being perpendicular to a longitudinal axis, said wheel spoke adjuster guard being slidably mounted on a wheel spoke, said wheel spoke adjuster guard having an internal cavity defined therein, said internal cavity being centrally located and having a lower portion and an upper portion, said lower portion having a shape complementary to an octagonally shaped nut common to wheel adjuster nuts, said upper portion being circular in shape and having a diameter complimentary to common wheel spokes;
b) a fastening means to lock said wheel spoke adjuster guard in a fixed position on said wheel spoke; and
c) said wheel spoke adjuster guard having a shape of a three sided pyramid, said top of said wheel spoke adjuster guard being smaller than said bottom of said wheel adjuster guard.

3. The wheel spoke adjuster guard, as in claim 1, wherein; said means to lock said wheel spoke adjuster guard in position on a common wheel spoke comprises a side of said four sided pyramid having a threaded hole defined therein, said threaded hole communicating with said internal cavity defined in said four sided pyramid, said threaded hole allowing a threaded set screw to be threadably engaged therein, said threaded set screw bearing against a nut element of the spoked portion of the wheel, preventing said wheel spoke adjuster guard from sliding along said spoke.

4. The wheel spoke adjuster guard, as in claim 2, wherein; said means to lock said wheel spoke adjuster guard in position on a common wheel spoke comprises of a side of said three sided pyramid having a threaded hole defined therein, said threaded hole communicating with said internal cavity defined in said three sided pyramid, said threaded hole allowing a threaded set screw to be threadably engaged therein, said threaded set screw bearing against a nut element of the spoked portion of the wheel, preventing said wheel spoke adjuster guard from sliding along said spoke.

5. The wheel spoke adjuster guard, as in claim 2, wherein; said means to seal said wheel spoke adjuster guard from contaminants consists of an upper seal, said upper seal being installed in said upper portion of said internal cavity, and a lower seal, said lower seal being installed in said lower portion of said internal cavity.

* * * * *